(12) United States Patent
Sampica et al.

(10) Patent No.: US 6,284,088 B1
(45) Date of Patent: Sep. 4, 2001

(54) METHOD AND APPARATUS FOR BONDING OPTICAL FILMS IN PRECISION ALIGNMENT

(75) Inventors: James D. Sampica, Central City; Mel L. Campbell; Dennis M. Ternes, both of Marion; Paul R. Nemeth, Cedar Rapids, all of IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/384,001

(22) Filed: Aug. 26, 1999

(51) Int. Cl.[7] ............... B32B 31/00; B23Q 3/00
(52) U.S. Cl. ............ 156/285; 29/281.5; 29/464; 156/580; 269/21
(58) Field of Search .................. 156/285, 230, 156/580; 248/309.3, 363; 269/21; 29/271, 281.5, 464; 40/595

(56) References Cited

U.S. PATENT DOCUMENTS

| D. 391,822 | * | 3/1998 | Appelbaum | D8/98 |
| 3,761,344 | * | 9/1973 | Mrozek et al. | 40/595 |
| 5,592,288 | * | 1/1997 | Sampica et al. | 356/62 |

* cited by examiner

Primary Examiner—Michael W. Ball
Assistant Examiner—Todd J. Kilkenny
(74) Attorney, Agent, or Firm—Nathan O. Jensen; Kyle Eppele

(57) ABSTRACT

A system and method for fabricating multi-layer optical compensators which includes a rigid or flexible planar guide member having reference lines thereon for aiding in alignment of successive layers and further having a vacuum producing capability which stabilizes the compensator when it is processed, along with the guide member, through a roller machine.

14 Claims, 1 Drawing Sheet

METHOD AND APPARATUS FOR BONDING OPTICAL FILMS IN PRECISION ALIGNMENT

FIELD OF THE INVENTION

The present invention generally relates to optical films, and more particularly relates to bonding of several optical films, and even more particularly relates to methods and apparatuses for maintaining critical parameters of angular alignment between several bonded optical films.

BACKGROUND OF THE INVENTION

In the past, optical films have been bonded together during fabrication of liquid crystal displays and other optical devices. Avionics engineers have routinely endeavored to utilize predetermined portions of previously manufactured optical film sheets because of the preferred nature of the portion in comparison to other portions of the optical film. When multiple optical films are used, in which each film has a predetermined preferred portion, it is often desirable to attempt to align these preferred portions during the process of bonding the optical films together. One approach has been to use a pen or other marker to encircle the preferred portion of each film and then attempt to manually align the encircled portions by a simple visual alignment of one encircling line on a first optical film with another encircling line on a second optical film.

While this approach has benefits of simplicity and ease of use, it also has significant drawbacks. A significant problem of this type of approach is that it often fails to provide sufficient angular alignment of the critical axes of the various films as is often required by the most rigorous performance specifications.

Consequently, there exists a need for improved methods and apparatuses for aligning preferred portions of optical films in a multi-film bonding process.

SUMMARY OF THE INVENTION

It is an object of the present invention to provide high performance multi-film optical components.

It is a feature of the present invention to utilize a grid plate reference to aid in angular alignment of films.

It is an advantage of the present invention to achieve more precise angular alignment of the various optical axes of numerous films with respect to their predetermined preferred portions.

It is another advantage of the present invention to reduce any gradual accumulation of angular alignment errors caused by basing each successive film alignment upon placement with respect to a potentially already misaligned film.

It is another feature to use a vacuum chuck to maintain angular alignment of such films.

It is another advantage of the present invention to provide stability of the films during the rollering process often used in bonding multiple films.

The present invention is an apparatus and method for bonding multiple optical films which are designed to satisfy the aforementioned needs, provide the previously stated objects, include the above-listed features and achieve the already articulated advantages. The present invention is carried out in an "angular misalignment-less" manner in a sense that angular misalignment of the films has been greatly reduced.

Accordingly, the present invention is a method and apparatus which includes an indexed grid plate and in an alternate embodiment, a vacuum chuck, both for cooperation with optical films during a rollering segment of the film bonding process.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
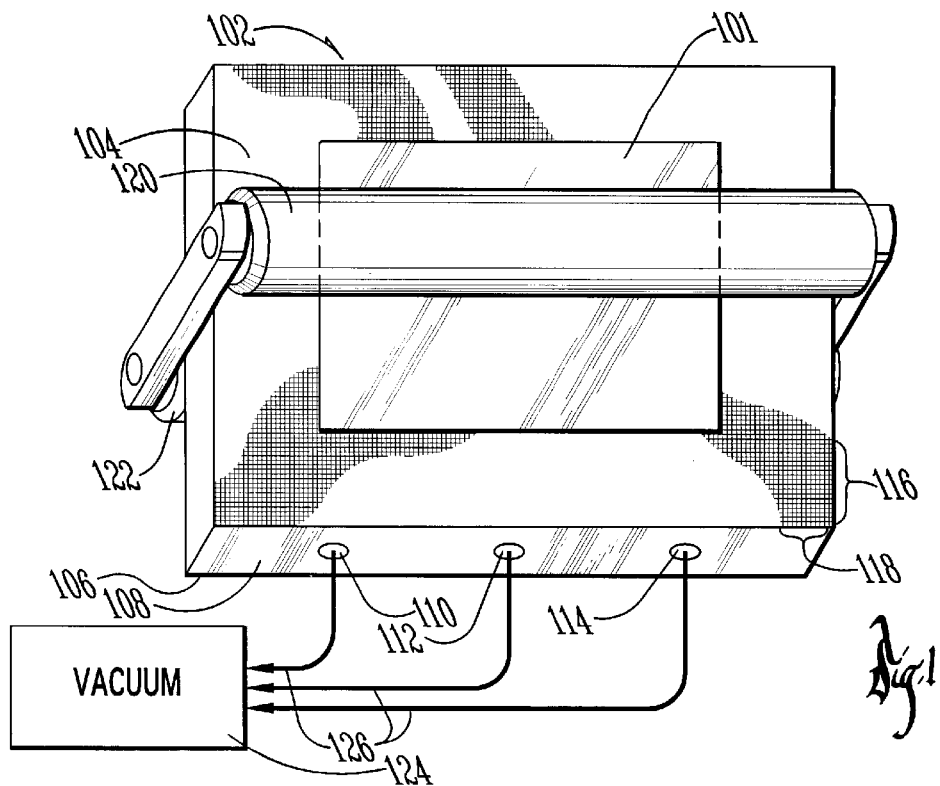
FIG. 1 is a simplified perspective drawing of the vacuum guide of the present invention, disposed in a roller machine with an optical film disposed thereon.

Now referring to the drawings, wherein like numerals refer to like matter throughout, there is shown in FIG. 1, a vacuum grid plate 102, of the present invention. Vacuum grid plate 102 may be made of any suitable material which provides sufficient rigidity and stability, but it is believed that hard-coated aluminum, stainless steel, or equivalent may be preferred when a clean room is required. Vacuum grid plate 102 has a grid plate top 104 with milled or chemically etched reference grooves therein to aid in alignment of films. Horizontal grid lines 116 and vertical grid lines 118 are representative of such reference grooves. The depth of such etched or milled reference grooves may typically be 0.010 inch or as desired and may be etched or milled, using well-known techniques. The terms horizontal and vertical are used herein to aid in understanding; however, it should be readily understood that any pattern of reference lines may be used. It is believed that orthogonal horizontal and vertical lines with some identification scheme, such as numbering or lettering is a preferred embodiment. Vacuum hose connection edge 108 between grid plate top 104 and grid plate bottom 106 is shown having first vacuum port 110, center vacuum port 112, and second vacuum port 114 therein. The thickness of vacuum grid plate 102 across vacuum hose connection edge 108 is a matter of design choice but may be ½–3/4 inch to facilitate necessary boring of passages through vacuum grid plate 102. These ports are for connecting vacuum hoses 126 with vacuum source 124. Vacuum grid plate 102 is shown having an optical film 101 thereon and being disposed between top roller 120 and bottom roller 122. Optical film 101 may be any type of optical film; however, it is believed that the beneficial aspects of precision alignment offered by the present invention may be most advantageous when optical film 101 is an optical retardation film (optical compensator) or polarizing film. FIG. 1 shows an orientation of vacuum grid plate 102 and top roller 120 representing a middle point during a rollering process where optical film 101 is applied to another film disposed immediately below it. The process of rollering of optical films together and onto substrates, as well as the rollering machines deployed therein, are well known in the art. However, the use of a ruled grid plate is believed to be novel, as well as the use of vacuum stabilization in optical film bonding is also believed to be novel.

Figure 2:
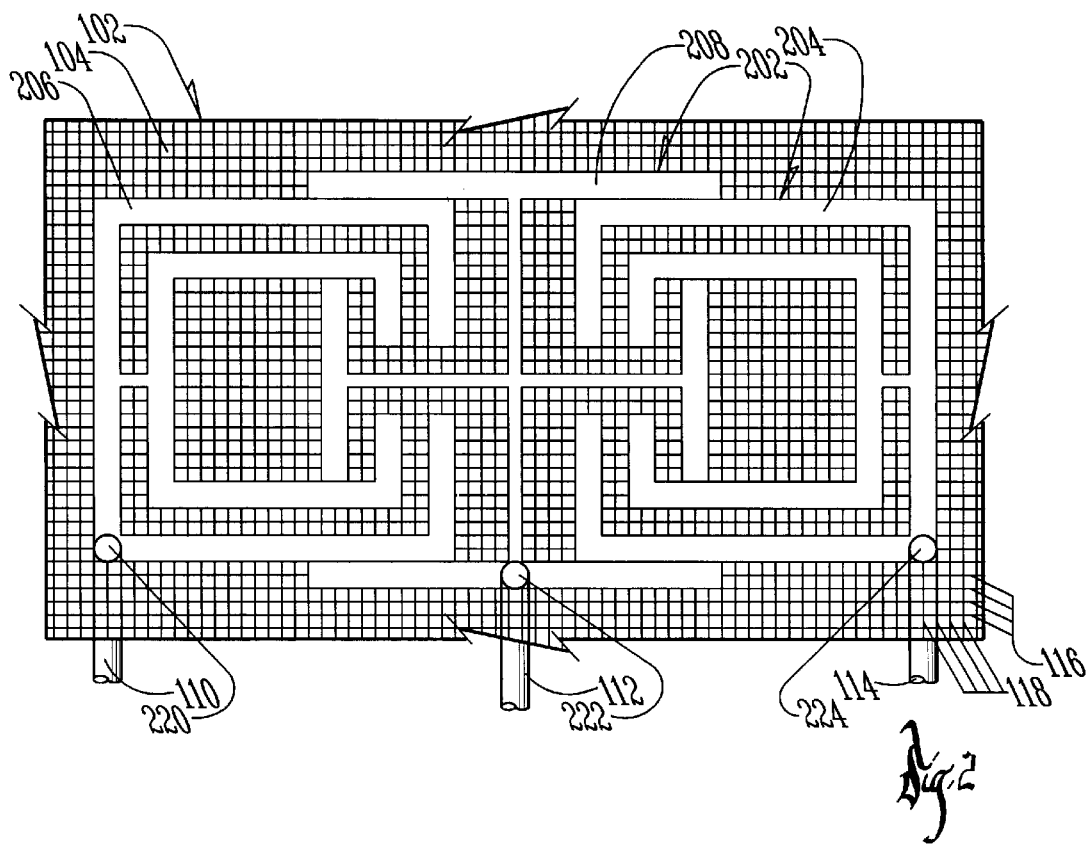
FIG. 2 is a more detailed view of the vacuum guide of the present invention.

A more thorough understanding of the present invention may be achieved by now referring to FIG. 2, which gives a more detailed view of the vacuum grid plate 102 of FIG. 1. Vacuum grid plate 102 is shown having on grid plate top 104 a vacuum channel system 202, which may be voids in vacuum grid plate 102. These voids or vacuum grooves are separate and distinct from the reference grooves and horizontal grid lines 116 and vertical grid lines 118, and may have various dimensions, depending upon the details of the lamination process. However, it is believed that vacuum grooves with a depth of 0.032 and a width of 0.062 may be preferred. The length of vacuum grooves is also a matter of design choice which may vary, depending upon various factors, including size of any glass substrate being fed through top roller 120 and bottom roller 122, as well as the amount of vacuum applied and others. The process used to create the vacuum grooves is dependent upon the dimensions desired, but either milling or chemical etching are contemplated. The vacuum grooves and reference grooves may be separated by a dead zone (an area without any grooves therein) to minimize any vacuum leakage. First vacuum groove pattern 206 is shown coupled to first vacuum port 110 by a first vacuum air passage 220, which may be an air passage bored through vacuum grid plate 102 and coupled to first vacuum groove pattern 206. Similarly, center vacuum groove pattern 208 and second vacuum groove pattern 204 are coupled to center vacuum port 112 and second vacuum port 114, respectively through center vacuum air passage 222 and second vacuum air passage 224, respectively. The dimensions of first vacuum air passage 220 are a matter of design choice; however, a diameter of 0.125 inches may be preferred.

In operation, and now referring to FIGS. 1 and 2, the present invention may provide its benefits as follows: A first optical film is disposed on grid plate top 104 and is aligned with one of said horizontal grid lines 116 and/or one of said vertical grid lines 118. The film and vacuum grid plate 102 is inserted between top roller 120 and bottom roller 122, which clamp down thereon. A second film, on a rigid substrate, is then disposed on vacuum grid plate 102 and is aligned with reference being made to horizontal grid lines 116 and vertical grid lines 118. The alignment of the second film to the first film is, therefore, done indirectly through the horizontal grid lines 116 and the vertical grid lines 118. The axes being aligned will depend upon the type of films being bonded. However, when polarizers are being bonded, then absorption axes are important, and when optical compensators are used, then the optical axes and rub directions are important to be maintained in angular alignment. Once the alignment is completed, then a vacuum is applied to one or more of first vacuum groove pattern 206, center vacuum groove pattern 208 and second vacuum groove pattern 204, by applying a vacuum to their respective ports. The amount of vacuum pressure is a matter of designer's choice based upon the particular details of the entire lamination and optical film system involved; however, a pressure of <14 PSIA may be preferred. A vacuum is then sustained in all portions of vacuum channel system 202 when the substrate is placed thereon. This vacuum creates an increased pressure characteristic between the substrate and the grid plate top 104. This increased pressure results in a higher friction characteristic between the substrate and grid plate top 104, thereby stabilizing the substrate from motion with respect to vacuum grid plate 102 during the rollering process. In a preferred embodiment, first vacuum groove pattern 206, center vacuum groove pattern 208, and second vacuum groove pattern 204 are independent groove systems allowing for independent and selectable application of vacuum pressure across various portions of vacuum channel system 202.

Other methods of limiting unwanted motion between the grid plate and an object placed thereon are also contemplated, such as adhesives, clamps etc. The combination of the first film, the second film and its associated temporary glass substrate and the vacuum grid plate 102 are passed (without stopping at intermediate points) through top roller 120 and bottom roller 122. After the first film and the second film are so bonded to each other, then the temporary glass substrate of the second film may be removed, using well-known techniques, such as the use of a release machine. This process is repeated for each successive film to be laminated to the stack of optical films.

Additionally, the optical films as discussed herein may include one or more o-plate compensators, a-plate compensators, c-plate compensators, or other birefringent materials.

It is thought that the method and apparatus of the present invention will be understood from the foregoing description, and that it will be apparent that various changes may be made in the form, construct steps and arrangement of the parts and steps thereof, without departing from the spirit and scope of the invention or sacrificing all of their material advantages. The form herein described is merely a preferred exemplary embodiment thereof.

We claim:

1. An apparatus comprising:
    a roller and support member combination, having disposed therebetween said first optical retardation film; and,
    a horizontal ruled grid plate, having a plurality of reference features thereon, said ruled grid plate disposed between said roller and support member and adjacent to said first optical retardation film, where said ruled grid plate provides an aid for precision horizontal alignment of said first optical retardation film with respect to said plurality of reference features; and,
    said second optical retardation film disposed in a vertically layered configuration between said first optical retardation film and said ruled grid plate, where said second optical retardation film has a horizontal alignment characteristic with said plurality of reference features.

2. An apparatus of claim 1 wherein said support member is a roller.

3. An apparatus of claim 1 wherein said reference features are reference grooves in said ruled grid plate.

4. An apparatus of claim 1 wherein said ruled grid plate has a surface feature thereon for increasing a friction characteristic between a substrate coupled to said second optical film placed upon a top surface of said ruled grid plate.

5. An apparatus of claim 4 wherein said surface feature includes an adhesive.

6. An apparatus of claim 4 wherein said surface feature includes a vacuum chamber groove.

7. An apparatus of claim 6 further comprising a vacuum source coupled to said ruled grid plate for evacuating air from between said vacuum chamber groove and said substrate.

8. An apparatus of claim 7 wherein said first optical retardation film is an o-plate and said second retardation film is an o-plate.

9. An apparatus of claim 7 wherein said vacuum chamber groove has a plurality of pneumatically independent sections which are individually addressed by said vacuum source.

10. A method of bonding a plurality of optical films with a predetermined alignment characteristic, said method comprising the steps of:

providing a first roller and support member combination;

providing a first optical film, having a first axis associated therewith;

providing a rigid ruled guide between said roller and support member, having registration lines thereon;

providing a second optical film, having a second axis associated therewith and further having an orientation characteristic with respect to said first optical film which is achieved through orientation of said first axis and said second axis with respect to said registration lines; and, providing a roller induced pressure to said second optical film, so as to bond to said first optical film.

11. A method of claim 10 further comprising the step of:

providing a vacuum pressure to said rigid ruled guide, said vacuum pressure for stabilizing said second optical film on said rigid ruled guide during the step of providing a roller induced pressure.

12. A method of claim 11 wherein said step of providing a second optical film includes providing a second optical film disposed on a substrate.

13. A method of claim 12 wherein said support member is a second roller.

14. A method of claim 13 further comprising the steps of:

removing said second optical film from said substrate;

clamping said first optical film and said second optical film using said first roller;

providing a third optical film between said second optical film and said rigid ruled guide, where an angular alignment of a third axes is arranged with respect to said registration lines; and, providing a third optical film binding vacuum to said ruled rigid guide to stabilize said third optical film with respect to said reference lines.

* * * * *